United States Patent [19]

Bentz

[11] Patent Number: 5,040,257
[45] Date of Patent: Aug. 20, 1991

[54] AIRCRAFT LOADING BRIDGE EXTENDER

[76] Inventor: Carl I. Bentz, 5923 Birchdale Dr., Fort Wayne, Ind. 46815

[21] Appl. No.: 537,350

[22] Filed: Jun. 13, 1990

[51] Int. Cl.⁵ .............................................. B65G 15/00
[52] U.S. Cl. ........................................... 14/70; 14/71.1
[58] Field of Search ............................. 14/69.5–72.5; 182/117

[56] References Cited

U.S. PATENT DOCUMENTS

| | | | |
|---|---|---|---|
| 2,362,170 | 11/1944 | Swaisgood | 14/72.5 X |
| 2,778,674 | 1/1957 | Attendu | 14/725 X |
| 2,885,242 | 5/1959 | Spatta | 296/28 |
| 3,263,253 | 8/1966 | Wollard et al. | 14/71 |
| 3,341,875 | 9/1967 | Wollard et al. | 14/71 |
| 3,369,264 | 2/1968 | Kurka et al. | 14/71 |
| 3,404,417 | 10/1968 | Wollard et al. | 14/71 |
| 3,462,784 | 8/1969 | Seipos | 14/71 |
| 3,537,745 | 11/1970 | Herring, Jr. | 14/71.5 X |
| 4,366,591 | 1/1983 | Zimmerman | 14/71.3 |
| 4,517,698 | 5/1985 | Lamp'l et al. | 14/69.5 X |
| 4,698,866 | 10/1987 | Kano | 14/24 X |
| 4,787,111 | 11/1988 | Pacek et al. | 14/71.1 |
| 4,941,547 | 7/1990 | Livick | 182/117 X |

FOREIGN PATENT DOCUMENTS 2092986 8/1982 United Kingdom .................. 14/725

Primary Examiner—Ramon S. Britts
Assistant Examiner—Gay Ann Spahn
Attorney, Agent, or Firm—Jeffers, Hoffman & Niewyk

[57] ABSTRACT

A conveyance loading apparatus for conveying passengers to and from an aircraft. The apparatus includes an elevated chamber with a sidewall structure. The sidewall structure includes a plurality of access openings so that passengers can enter and exit the chamber. One or more covered stairways are connected to one or more of the access openings for enabling passengers to have access to the chamber from ground level. The elevated chamber can be aligned with the open end of a conventional aircraft loading bridge. One or more covered stairways are connected to respective access openings for enabling passengers to have access to the chamber from ground level. A covered walkway is connected to a stairway at ground level.

35 Claims, 3 Drawing Sheets

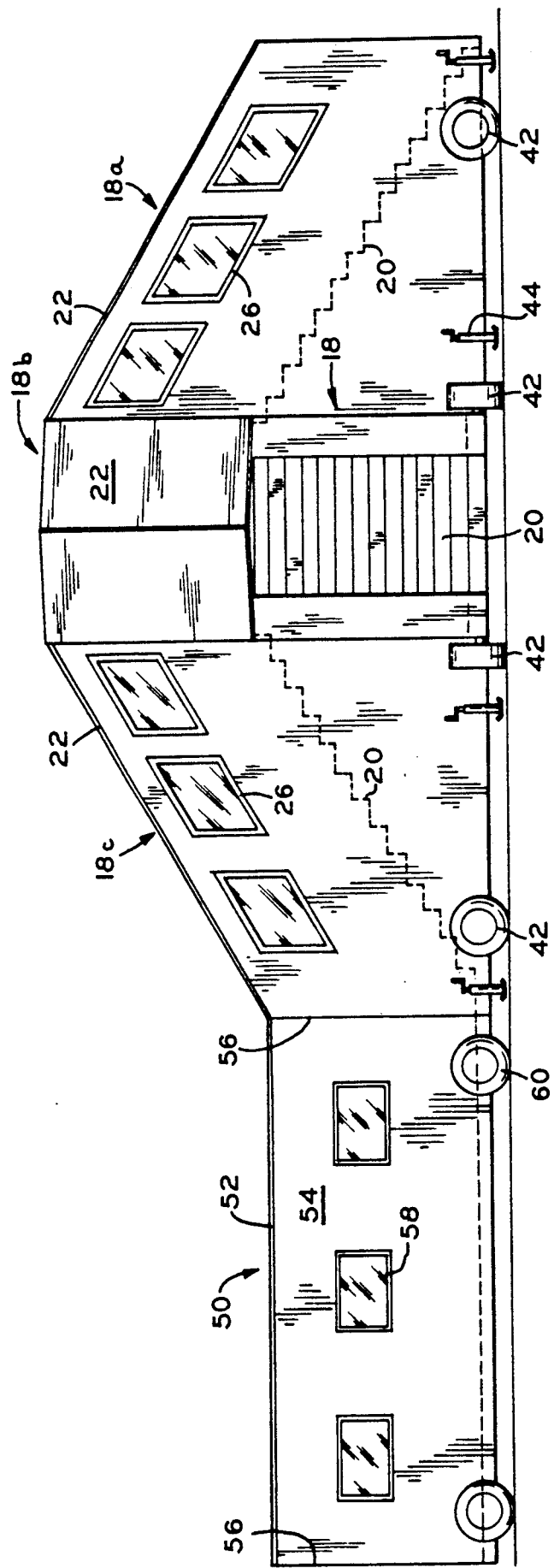

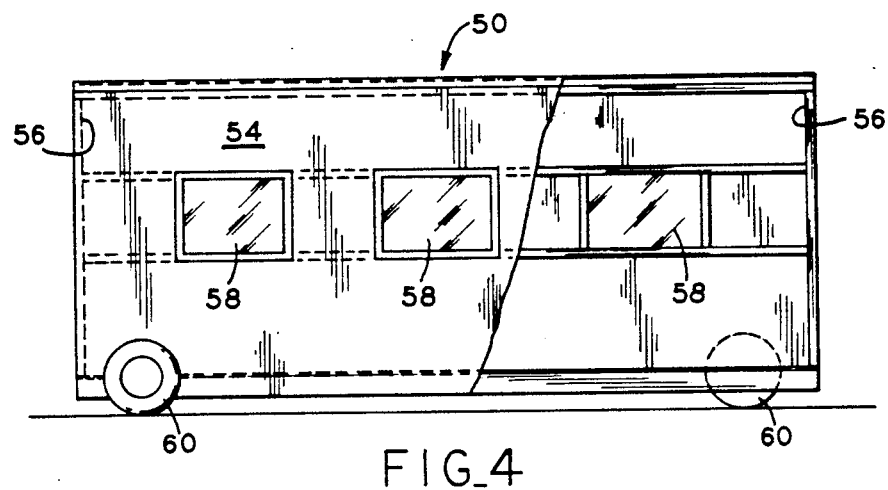
FIG_4
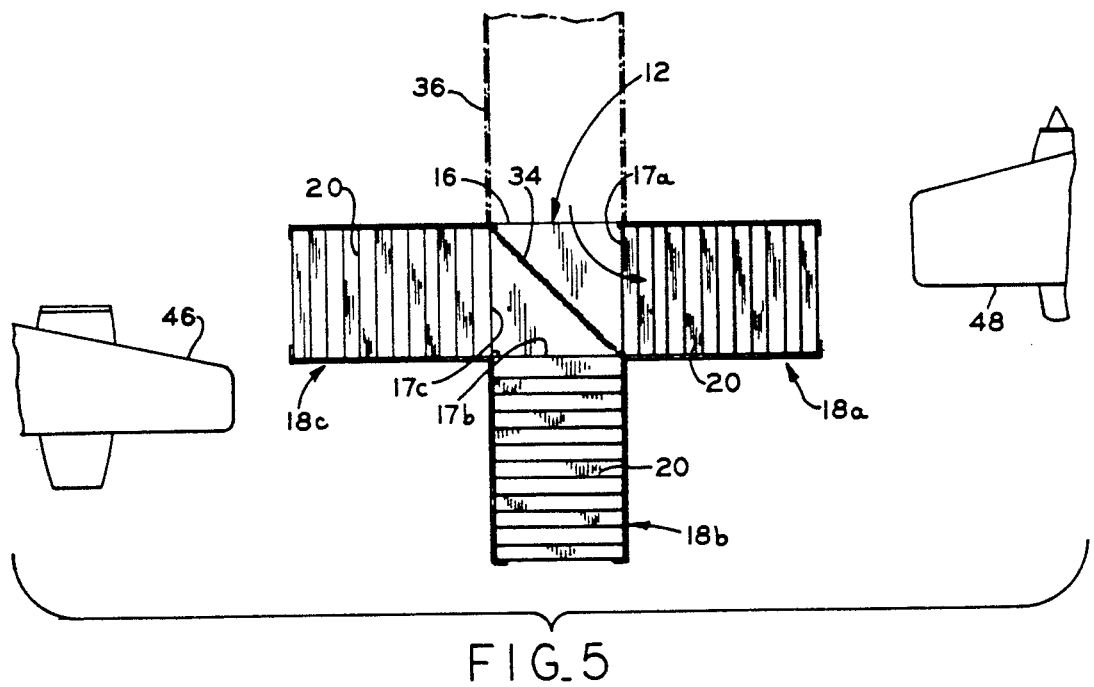
FIG_5

AIRCRAFT LOADING BRIDGE EXTENDER

BACKGROUND OF THE INVENTION

This invention relates to loading ramps for conveying passengers to and from aircraft. More particularly, this invention relates to a loading bridge extender for conveying passengers to and from commuter aircraft from existing prior art loading bridges.

Covered mobile loading bridges for aircraft, sometimes called jet loaders, have been well known in the prior art. These devices generally comprise a terminal end portion secured to the airport terminal, an elongated mid portion, and an outer vestibule portion. The entire apparatus is elevated and is supported by a mobile undercarriage. These loading bridges provide a mobile walkway from an access door of an airport terminal to the access door of an aircraft. By virtue of the mobility of the apparatus, it can be aligned with the aircraft door of a parked aircraft. Generally, as the aircraft taxies to a stop at a desired location, the loading bridge is extended and adjusted to align both vertically and horizontally with the aircraft door so that passengers can step from the aircraft onto the loading bridge and walk through the loading bridge to the aircraft terminal. Since the entire bridge is covered, passengers are protected from inclement weather.

With the growing popularity of the hub concept for airlines, the use of commuter aircraft for travel from secondary airports to major airports has become common. Such commuter aircraft generally are smaller than large jet aircraft and carry fewer passengers. However, since commuter aircraft are smaller, conventional loading bridges cannot be horizontally aligned with the doors of commuter aircraft because the commuter aircraft access doors are too low. Accordingly, it has become common practice, in loading commuter aircraft to have the passengers descend a stairway inside the airport terminal, then to exit at ground level from the terminal and to walk across the tarmac to the commuter aircraft. By means of this loading method, for reasons of safety and because of airport regulations, it is possible to load or unload only a single commuter aircraft at a time from a single airport terminal exit door.

Due to this arrangement, the turn around time for unloading and loading a commuter aircraft after arrival at an airport terminal is much longer than desired. It is estimated that the time for the unloading and loading cycle for a commuter aircraft at major airports is approximately forty-five (45) minutes. The loading and unloading time increases the down time of aircraft and therefore adds substantially to the operating cost of airlines.

Conventional loading bridges generally also include an external, uncovered stairway which is utilized primarily by maintenance personnel for access to the loading bridge and to aircraft. Conventionally these stairways have metal treads with a diamond pattern therein to prevent slippage for maintenance personnel who may have oily shoes from working around aircraft. However, such stairs are not designed for general access to aircraft by passengers and would be unsuitable for that purpose. Generally the stairways are narrow, and furthermore the treads of such stairways would interfere with the high heels of female passengers.

Another problem with the above described method of conveying passengers to and from commuter aircraft is that the passengers are subjected to inclement weather such as rainy or stormy weather, which is of course undesirable.

It is therefore desired to provide an apparatus for safely, quickly, and efficiently loading and unloading commuter aircraft.

It is also desired to provide such as apparatus which can be utilized with existing loading bridges.

Furthermore, it is desired to provide an apparatus for simultaneously loading two or more commuter aircraft from a single airport terminal loading bridge.

Lastly, it is desired to provide a covered apparatus for conveying passengers to and from commuter aircraft to protect the passengers from inclement weather.

SUMMARY OF THE INVENTION

The present invention overcomes the above described disadvantages of the prior art devices for conveying passengers to and from commuter aircraft by providing a loading bridge extender.

The apparatus according to the present invention comprises a conveyance loading apparatus having an elevated chamber or vestibule with a plurality of access openings in the sidewall thereof to permit passengers to enter and exit the chamber. One or more covered stairways are connected to the respective access openings whereby passengers are enabled to have access to the chamber from ground level. Another of the chamber access openings can be aligned with the open end of an existing loading bridge. The entire apparatus is supported by a mobile undercarriage whereby the apparatus can be moved and adjusted to align with the end of a loading bridge as needed.

The apparatus according to the present invention includes an elevated chamber having a sidewall structure with a plurality of access openings therein. One of the access openings is adapted to be aligned with the exit of a conventional loading bridge. The other access openings in the chamber lead to covered stairways for connecting the elevated chamber to ground level. Thus passengers can move to and from an existing loading bridge by way of the apparatus according to the present invention and thereby have access to a commuter airplane parked adjacent one of the stairways. By means of the invention up to three commuter planes can be loaded simultaneously from a single conventional loading bridge by the provision of a loading bridge extension with three stairways. Additionally, a divider or barrier can be provided in the chamber to guide passengers between the exit of the loading bridge and the stairway located nearest the commuter aircraft which is being loaded or unloaded. Once that aircraft has been loaded or unloaded, the barrier can be moved to guide passengers between the exit of the loading bridge and another waiting aircraft. Windows can be provided in the chamber and in the stairways. Additionally, lighting can be provided in the covered stairways and chamber for night time loading or unloading operations. Lastly, the invention also comprises providing a mobile covered walkway which connects with the ground level stairway access opening and which can convey passengers from the stairway to an aircraft parked at some distance from the stairway. A plurality of such walkways can be used to extend as far as desired from the stairway to the parked aircraft.

One advantage of the present invention is that it provides a method of utilizing existing loading bridges for loading commuter aircraft.

Another advantage of the present invention is that it provides a way to simultaneously load and unload several commuter aircraft from a single loading bridge. Thus the apparatus of the present invention substantially reduces the loading and unloading time of commuter aircraft and permits better utilization of such aircraft.

Still another advantage of the present invention is that it permits passengers, during loading or unloading of commuter aircraft, to be sheltered from inclement weather.

A further advantage of the present invention is that use of the apparatus is flexible since one or more aircraft can be loaded simultaneously, passengers can be guided through the chamber of the apparatus to the intended aircraft, and the length of the covered walkways can be varied depending upon the need.

Lastly, a still further advantage of the present invention is that the entire apparatus is mobile so that it can be moved and adjusted as needed.

The present invention, in one form thereof, comprises a conveyance loading apparatus for conveying passengers to and from an aircraft. The apparatus includes an elevated chamber which has a sidewall structure with a plurality of access openings therein so that passengers can enter and exit the chamber. A covered stairway is connected to at least one of the access openings for enabling passengers to have access to the chamber from ground level. A mobile undercarriage supports the chamber and the stairway.

The present invention, in one form thereof, further comprises a conveyance loading apparatus for conveying passengers to and from an aircraft. The apparatus includes an elevated chamber which has a sidewall structure with a plurality of access openings therein so that passengers can enter and exit the chamber. A plurality of stairways are provided, each of which is connected to one of the respective access openings, save one, for enabling passengers to have access to the chamber from ground level.

The present invention, in one form thereof, further comprises a conveyance loading apparatus for conveying passengers to and from an aircraft and includes an elevated chamber. The chamber includes a sidewall structure with a plurality of access openings therein through which passengers can enter and exit the chamber. A plurality of covered stairways are provided, each covered stairway being connected to a respective access opening, save one, for enabling passengers to have access to the chamber from ground level.

The present invention, in one form thereof, further comprises a conveyance loading apparatus for conveying passengers to and from an aircraft and comprises a covered walkway and a wheeled undercarriage for the walkway.

The present invention, in one form thereof, further comprises a conveyance loading apparatus for conveying passengers to and from an aircraft. The apparatus includes an elevated chamber which has a sidewall structure and a plurality of access openings therein so that the passengers can enter and exit the chamber. A covered stairway is connected to at least one of the access openings for enabling passengers to have access to the chamber from ground level. A mobile undercarriage is provided for supporting the chamber and the stairway. A mobile covered walkway is connected to the stairway at ground level.

It is an object of the present invention to provide a conveyance loading apparatus for extending a conventional loading bridge for conveying passengers to and from a commuter aircraft.

Another object of the present invention is to provide such a structure which protects passengers from inclement weather.

A further object of the present invention is to provide a loading bridge extender which is flexible and permits the simultaneous loading and unloading of several commuter aircraft from a single conventional loading bridge.

A still further object of the present invention is to provide a loading bridge extender which is mobile and which can be extended to various lengths as desired for particular applications.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a side elevational view of another embodiment of the loading apparatus according to the present invention including two stairways and a covered walkway;

FIG. 4 is an elevational, partially in cross section, view of a walkway according to the present invention; and FIG. 5 is a schematic representation of the loading bridge extender according to the present invention in use for simultaneously loading three aircraft.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENT

Figure 1:
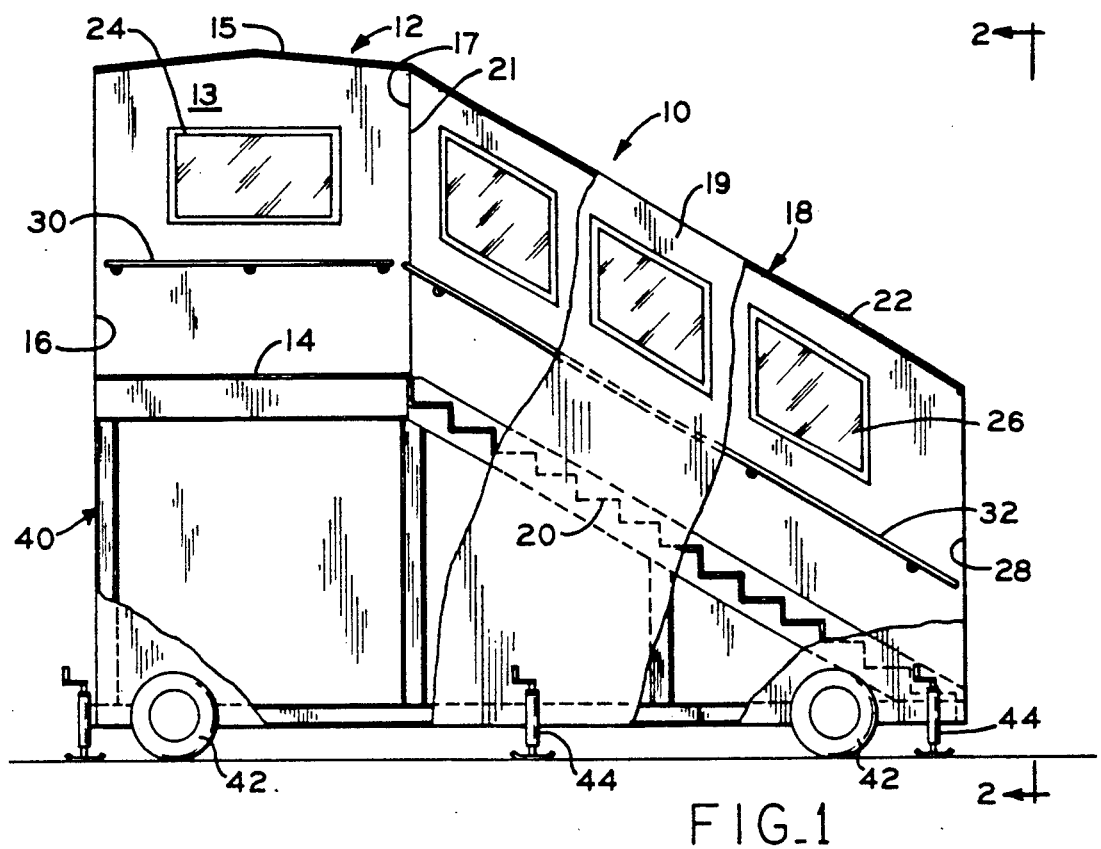
FIG. 1 is a front elevational view, partially in cross section, of a loading bridge extender according to the present invention including one stairway.
Figure 2:
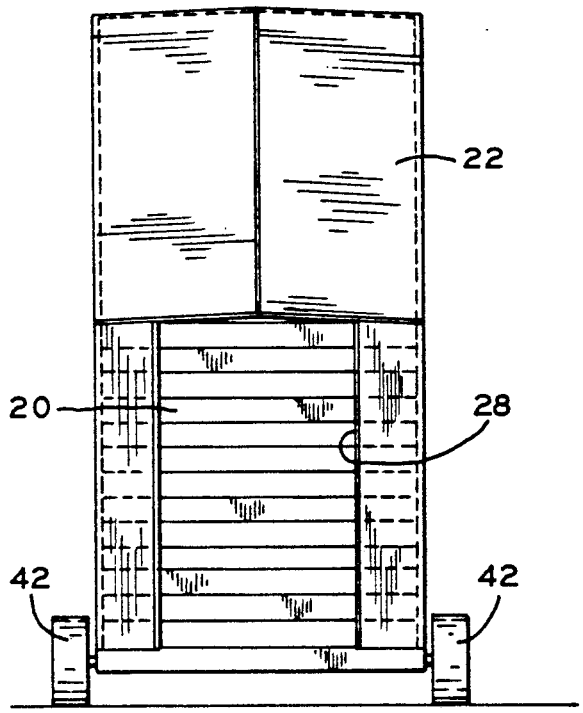
FIG. 2 is a side elevational view of the apparatus of FIG. 1 taken along line 2—2 thereof.

Referring to FIGS. 1 and 2 there is shown a loading bridge extender 10 having an elevated chamber or vestibule 12 and a covered stairway 18. For purposes of illustration, FIG. 1 is shown in partial cross section so that the interior of both chamber 12 and stairway 18 can be seen. Chamber 12 includes upstanding wall structure 13, a floor 14, and a roof 15. The chamber forms an elevated enclosure to protect passengers from inclement weather. The chamber includes an access opening 16 and an access opening 17. Thus passengers can enter or exit the chamber from either access opening 16 or 17. Access opening 16 is intended to be aligned with the open end of a conventional loading bridge (not shown) so that passengers can step from the loading bridge directly into chamber 12 or vice versa. Access opening 17 is connected to an open end 21 of a covered stairway 18. Covered stairway 18 includes sidewalls 19, treads 20 and a roof 22. The walls of chamber 12 include windows 24 so that the interior of chamber 12 will be illuminated. Similarly, covered stairway 18 includes windows 26 to illuminate the interior thereof. Covered stairway 18 includes a second open end 28 which is located at ground level whereby passengers, after entering chamber 12, can walk down stairs 20 and exit the stairway open end 28 onto the tarmac. Chamber 12 also includes a handrail 30 and covered stairway 18 includes a handrail 32.

Referring now to FIG. 5, the loading bridge extender, in use, is shown diagrammatically. In the embodiment of FIG. 5, three stairways 18a, 18b, and 18c are shown. Furthermore the open end of loading bridge 36 is shown in dashed lines in alignment with chamber 12. A barrier 34 is shown dividing chamber 12 into two areas whereby passengers will be guided by the barrier to move from loading bridge 36 into stairway 18a as shown by the arrow. Thus if it is desired to load aircraft 48, passengers can exit through stairway 18a to walk to aircraft 48. Barrier 34 may be any suitable barrier such as a movable chain or the like. Accordingly, barrier 34 can be moved if it is desired instead to load aircraft 46 whereby passengers can be routed through loading bridge 36 and stairway 18c. Similarly, if it is desired not to use the barrier, two aircraft can be simultaneously loaded or unloaded and passengers can ascend or descend stairways 18a and 18c and mingle in the chamber. No aircraft has been shown parked alongside stairway 18b. However it should be noted that three aircraft may be simultaneously unloaded or loaded. If it is desired to block stairways 18a and 18c, two barriers could be used to block access openings 17a and 17c of chamber 12.

The entire structure of chamber 12 and stairway 18 may be mounted on a mobile frame 40 having wheels 42 so that the entire structure is movable. However, chamber 12 and stairway 18 could also be individually mounted on wheeled structures and moved into place. For instance, in the configuration of FIG. 5, three separate stairways could be provided on wheeled structures and moved into place as desired together with a chamber 12. Jacks 44 may also be provided for the wheeled structure so that the jacks may stabilize the structure and prevent it from rolling during loading and unloading of passengers.

Referring now to FIG. 4, covered walkway 50 is shown which can be used to extend from the ground level open end of one of the stairways to close proximity of an aircraft. This is particularly useful in inclement weather, for instance during rain storms or in cold weather to protect passengers as they move to or from an aircraft. Covered walkway 50 includes a roof 52, sidewalls 54 and two openings 56 at either end of the walkway. The walkway is also provided with windows 58 and wheels 60 so that the entire structure 50 is mobile.

As shown in FIG. 3, an assembly of a chamber 12 and three stairways 18a, 18b and 18c are shown together with a covered walkway 52 for extending stairway 18c. If desired a number of walkways 52 may be used to extend the covered area for passengers as far as desired.

The structure may also be provided with electrical lighting so that night operations are possible. Such a lighting structure can be provided with suitable electrical connections to connect to the electrical source of supply of a conventional loading bridge. Similarly, emergency lighting may be provided by battery backup. The interior of the chamber, stairways, and walkway may be provided with carpeting to prevent slippage of passengers and for greater comfort.

One advantage of the present invention is that it does not call for changes in existing loading bridge equipment but is simply an add-on to facilitate loading and unloading of commuter aircraft. Thus the normal waiting areas for passengers can be utilized as well as conventional exits therefrom together with conventional loading bridges. The structure provides for significant improvement in loading and unloading of commuter aircraft and for a substantial time savings and therefore better utilization of commuter aircraft.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A loading apparatus for conveying passengers to and from an aircraft comprising:
    an elevated chamber, said chamber including a sidewall structure and a plurality of access openings in said sidewall structure whereby passengers can enter and exit said chamber;
    a covered stairway connected to at least one of said access openings for enabling passengers to have access to said chamber from ground level; and
    a mobile undercarriage for supporting said chamber and stairway.

2. The apparatus according to claim 1 including a further stairway connected to another said access opening.

3. The apparatus according to claim 1 wherein said chamber includes a barrier means for guiding passengers from one said access opening through said chamber to another said access opening.

4. The apparatus according to claim 3 wherein said barrier means is removable.

5. The apparatus according to claim 2 wherein said further stairway is covered.

6. The apparatus according to claim 1 wherein said chamber includes a window.

7. The apparatus according to claim 1 wherein said chamber includes an electrical lighting system to illuminate the interior of said chamber.

8. The apparatus according to claim 1 including a stabilizer jack for stabilizing said mobile undercarriage.

9. The apparatus according to claim 1 including a covered walkway secured to said stairway at ground level.

10. A loading apparatus for conveying passengers to and from an aircraft comprising:
    an elevated chamber, said chamber including a sidewall structure and a plurality of access openings in said sidewall structure whereby passengers can enter and exit said chamber; and
    a plurality of stairways, one of said stairways being connected to each one of said respective access openings for enabling passengers to have access to said chamber from ground level.

11. The apparatus according to claim 10 wherein said stairways are covered.

12. The apparatus according to claim 10 wherein said chamber includes a barrier means for dividing said chamber and for guiding passengers from one said access opening through said chamber to another said access opening.

13. The apparatus according to claim 12 wherein said barrier means is movable whereby passengers can be guided between various access openings.

14. The apparatus according to claim 10 wherein said stairways are covered.

15. The apparatus according to claim 10 wherein said chamber includes a window.

16. The apparatus according to claim 10 wherein said chamber includes an electrical lighting system for illuminating the interior of said chamber.

17. The apparatus according to claim 10 including a mobile undercarriage and a stabilizer jack for stabilizing said mobile undercarriage.

18. The apparatus according to claim 10 including a covered walkway connected to said stairway at ground level.

19. A loading apparatus for conveying passengers to and from an aircraft comprising:
an elevated chamber, said chamber including a sidewall structure and a plurality of access openings in said sidewall structure through which passengers can enter and exit said chamber; and
a plurality of covered stairways, each said stairway being connected to one of said respective access openings except one access opening for enabling passengers to have access to said chamber from ground level.

20. The apparatus according to claim 19 wherein said chamber includes a barrier means for dividing said chamber and for guiding passengers from one said access opening through said chamber to another said access opening.

21. The apparatus according to claim 20 wherein said barrier means is movable whereby passengers can be guided between various access openings.

22. The apparatus according to claim 19 wherein said chamber includes a window.

23. The apparatus according to claim 19 wherein said chamber includes an electrical lighting system.

24. The apparatus according to claim 19 including a mobile undercarriage.

25. The apparatus according to claim 19 including a covered walkway secured to said stairway at ground level.

26. A loading apparatus for conveying passengers to and from an aircraft comprising:
an elevated chamber, said chamber including a sidewall structure and a plurality of access openings in said sidewall structure whereby passengers can enter and exit said chamber;
a covered stairway connected to at least one of said access openings for enabling passengers to have access to said chamber from ground level; and
a covered walkway connected to said stairway at ground level.

27. The apparatus according to claim 26 including two walls for said walkway, at least one of said walls including a window therein.

28. The apparatus according to claim 26 and including an electrical lighting system to illuminate the interior of said walkway.

29. The apparatus according to claim 26 including a further stairway connected to another said access opening.

30. The apparatus according to claim 26 wherein said chamber includes a barrier means for guiding passengers from one said access opening through said chamber to another said access opening.

31. The apparatus according to claim 30 wherein said barrier means is movable whereby passengers may be guided between various access means.

32. The apparatus according to claim 26 including a mobile undercarriage for said chamber and covered stairway.

33. The apparatus according to claim 26 wherein said chamber includes a window.

34. The apparatus according to claim 26 wherein said chamber includes an electrical lighting system to illuminate the interior of said chamber.

35. The apparatus according to claim 32 including a stabilizer jack for stabilizing said mobile undercarriage.

* * * * *